(12) United States Patent
Park et al.

(10) Patent No.: US 8,650,597 B2
(45) Date of Patent: Feb. 11, 2014

(54) HOME NETWORK SYSTEM AND METHOD OF RECORDING BROADCASTING CONTENT THEREOF

(75) Inventors: In Ho Park, Yongin-si (KR); Kyoung Don Nam, Yongin-si (KR)

(73) Assignee: Samsung Electronics Co., Ltd (KR)

(*) Notice: Subject to any disclaimer, the term of this patent is extended or adjusted under 35 U.S.C. 154(b) by 1141 days.

(21) Appl. No.: 11/776,277

(22) Filed: Jul. 11, 2007

(65) Prior Publication Data

US 2008/0163322 A1 Jul. 3, 2008

(30) Foreign Application Priority Data

Dec. 28, 2006 (KR) .......................... 10-2006-0136513

(51) Int. Cl.
*H04N 7/16* (2011.01)

(52) U.S. Cl.
USPC ............................................................ 725/62

(58) Field of Classification Search
None
See application file for complete search history.

(56) References Cited

U.S. PATENT DOCUMENTS

| | | | | |
|---|---|---|---|---|
| 5,721,829 A * | 2/1998 | Dunn et al. | ...................... | 725/87 |
| 6,393,201 B1 * | 5/2002 | Sakuramoto et al. | ............ | 386/95 |
| 6,681,396 B1 * | 1/2004 | Bates et al. | ...................... | 725/58 |
| 7,693,483 B1 * | 4/2010 | Norin et al. | .................. | 455/12.1 |
| 7,706,741 B2 * | 4/2010 | Patel et al. | ..................... | 455/3.05 |
| 7,937,728 B2 * | 5/2011 | Barsness et al. | ................. | 725/58 |
| 8,006,275 B1 * | 8/2011 | Poole et al. | ...................... | 725/96 |
| 2003/0143984 A1 * | 7/2003 | Umeda | ......................... | 455/414 |
| 2003/0204849 A1 * | 10/2003 | Watanabe | ....................... | 725/62 |
| 2004/0117859 A1 * | 6/2004 | Ohel | .............................. | 725/146 |
| 2006/0026653 A1 * | 2/2006 | Matsunami | ..................... | 725/81 |
| 2006/0253592 A1 * | 11/2006 | Oashi et al. | ................... | 709/227 |
| 2007/0073847 A1 * | 3/2007 | Lee | ................................ | 709/219 |
| 2007/0094691 A1 * | 4/2007 | Gazdzinski | ..................... | 725/62 |
| 2008/0005770 A1 * | 1/2008 | Acharya et al. | .............. | 725/101 |
| 2008/0115171 A1 * | 5/2008 | Barsness et al. | ................ | 725/58 |
| 2009/0097820 A1 * | 4/2009 | Furuyama | ....................... | 386/83 |

FOREIGN PATENT DOCUMENTS

KR 1020060109021 10/2006

* cited by examiner

*Primary Examiner* — Brian T Pendleton
*Assistant Examiner* — Jonathan V Lewis
(74) *Attorney, Agent, or Firm* — The Farrell Law Firm, P.C.

(57) ABSTRACT

A home network system and a method of recording broadcasting content thereof are provided, and includes requesting, by the mobile terminal, the server to send the broadcasting content; receiving, by the server, the broadcasting content from a broadcasting station and sending the received broadcasting content to the mobile terminal; displaying, by the mobile terminal, the received broadcasting content; requesting, if the displaying of the broadcasting content is interrupted, by the mobile terminal, the server to record the interrupted broadcasting content; and recording, by the server, the broadcasting content from an interrupted time point of the broadcasting content.

14 Claims, 8 Drawing Sheets

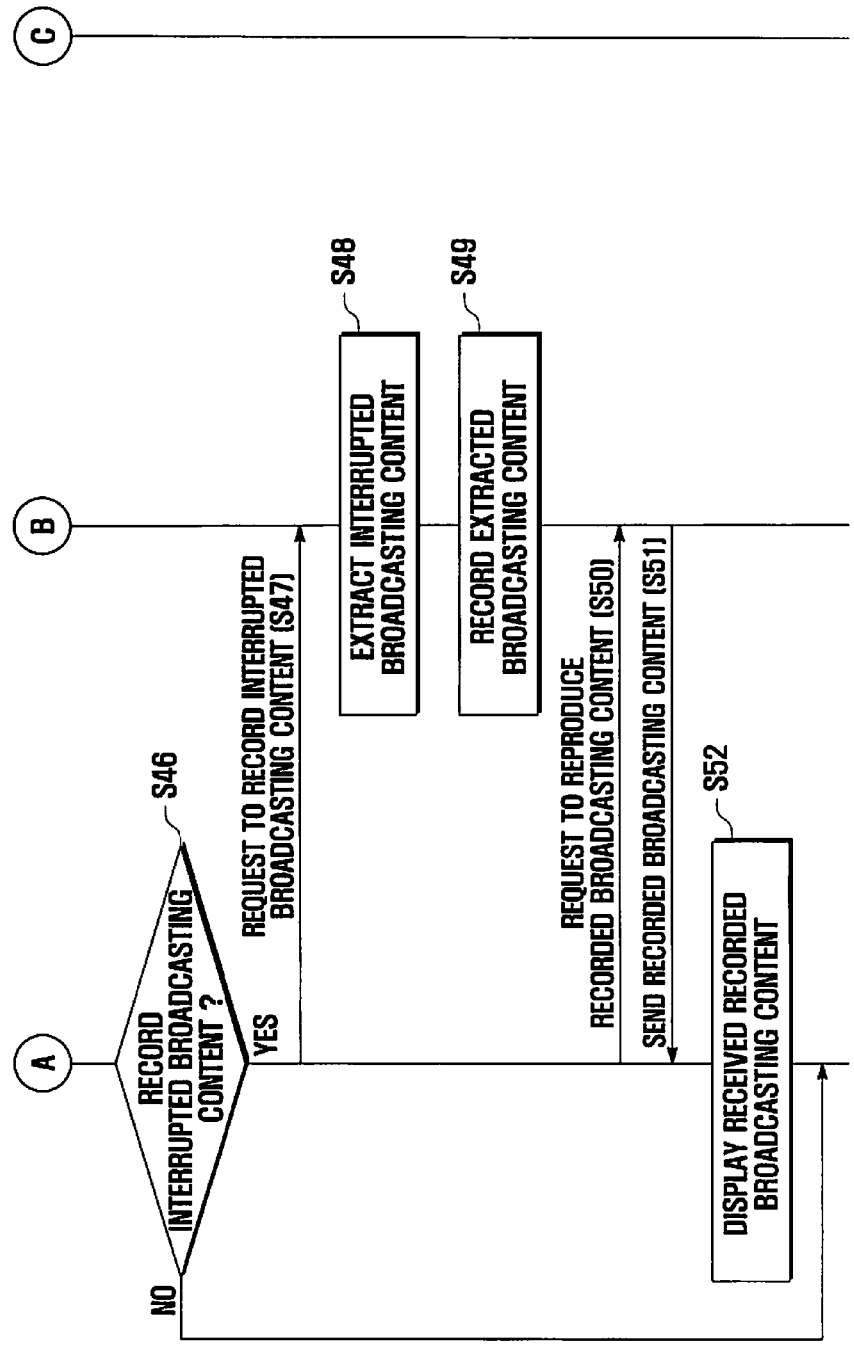

HOME NETWORK SYSTEM AND METHOD OF RECORDING BROADCASTING CONTENT THEREOF

PRIORITY

This application claims priority to an application entitled "HOME NETWORK SYSTEM AND METHOD OF RECORDING BROADCASTING CONTENT THEREOF" filed in the Korean Intellectual Property Office on Dec. 28, 2006 and assigned Serial No. 2006-0136513, the contents of which are incorporated herein by reference.

BACKGROUND OF THE INVENTION

1. Field of the Invention

The present invention relates to a home network system and a method of recording a broadcasting content thereof.

2. Description of the Related Art

Recently, home network technology for making home living more convenient has been spotlighted. The home network technology for constructing a network between electronic appliances within a home and for integrally controlling the electronic appliances through the network is further advanced than home automation technology for automatically controlling the electronic appliances within the home. The home network system connects various client devices such as home appliances, PCs, and IT devices to a server through wired and wireless communication and integrally controls and manages the devices.

A user of a mobile terminal connected to the server can view broadcasting content sent from the server in a streaming method almost regardless of location.

However, when power of a battery pack of the mobile terminal is dropped to a low level such that the mobile terminal cannot receive the broadcasting content and display the broadcasting content in a display unit, or when the mobile terminal performs communication, or when an alarm service of the mobile terminal is performed, the user needs to interrupt the viewing of the broadcasting content using the mobile terminal.

In this case, it is not easy for the user to view the interrupted broadcasting content from an interrupted point in time because the user needs to view again from the start of the interrupted broadcasting content or needs to directly find an interrupted point in time of the interrupted broadcasting content.

SUMMARY OF THE INVENTION

The present invention has been made in an effort to solve the above problems, and the present invention provides a home network system and a method of recording a broadcasting content thereof that enable a user to view broadcasting content for which viewing is interrupted, at a desired location and time, from an interrupted point in time.

In accordance with an aspect of the present invention, a method of recording a broadcasting content in a home network system that includes a mobile terminal and a home terminal connected to a server through a communication network includes requesting, by the mobile terminal, the server to send the broadcasting content; receiving, by the server, the broadcasting content from a broadcasting station and sending the received broadcasting content to the mobile terminal; displaying, by the mobile terminal, the received broadcasting content; if viewing of the broadcasting content is interrupted, requesting by the mobile terminal, the server to record the interrupted broadcasting content; and recording, by the server, the broadcasting content from an interrupted point in time of the broadcasting content.

In accordance with another aspect of the present invention, a method of recording broadcasting content in a home network system that includes a mobile terminal connected to a server through a wireless communication network includes receiving, by the mobile terminal, broadcasting content from a broadcasting station and displaying the received broadcasting content; if viewing of the broadcasting content is interrupted, requesting by the mobile terminal, the server to record the interrupted broadcasting content; and recording, by the server, the broadcasting content from an interrupted point in time of the broadcasting content.

In accordance with another aspect of the present invention, a home network system includes a server for receiving broadcasting content from a broadcasting station and for sending the received broadcasting content; and a mobile terminal for receiving and displaying the broadcasting content from a broadcasting station or a server and, if viewing of the received broadcasting content is interrupted, for requesting the server to record the interrupted broadcasting content, wherein the server records the broadcasting content from an interrupted point in time of the broadcasting content according to a request of the mobile terminal.

The home network system may further include a home terminal for requesting the server to reproduce the recorded broadcasting content and for receiving and displaying the recorded broadcasting content from the server.

BRIEF DESCRIPTION OF THE DRAWINGS

The objects, features and advantages of the present invention will be more apparent from the following detailed description in conjunction with the accompanying drawings, in which:

FIGS. 3A and 3B is a message flow diagram illustrating an execution process of a manual recording method selected in the method of FIG. 2;

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
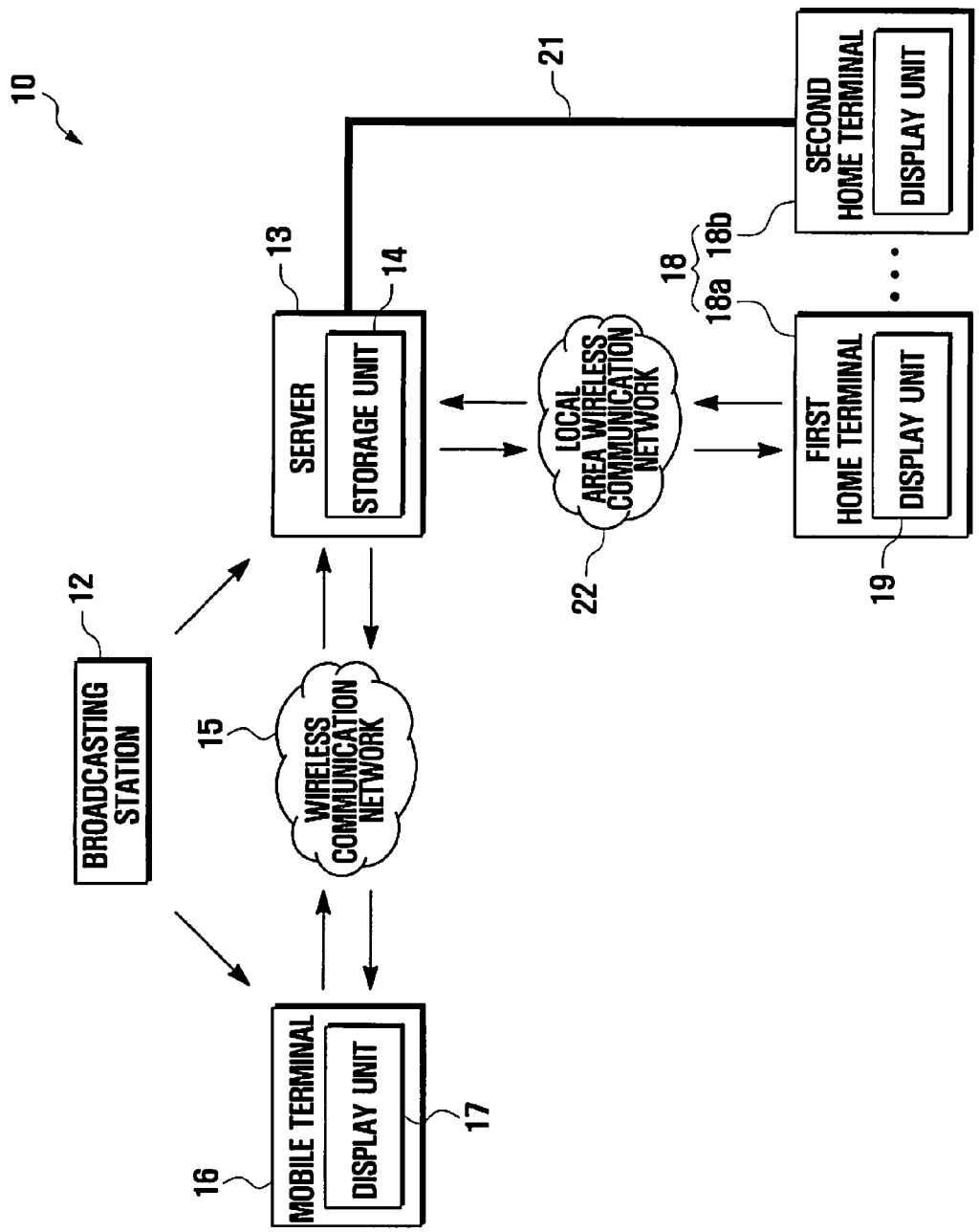
FIG. 1 is a block diagram illustrating a configuration of a home network system according to an exemplary embodiment of the present invention.

FIG. 1 is a block diagram illustrating a configuration of a home network system according to an exemplary embodiment of the present invention.

Referring to FIG. 1, a home network system 10 includes a server 13 having a storage unit 14, a mobile terminal 16 connected to the server 13 through a wireless communication network 15 and having a display unit 17, and home terminals 18 each connected to the server 13 through a wired communication network 21 or a wireless communication network 22 and each having a display unit 19 within a home. Hereinafter, "a terminal" may be the mobile terminal 16 or the home terminal 18.

The server 13 receives and sends broadcasting content from a broadcasting station 12. The mobile terminal 16 requests the server 13 to send the broadcasting content and displays the broadcasting content through the display unit 17 so that a user may view the broadcasting content received from the server 13. The mobile terminal 16 can directly receive and display the broadcasting content from the broadcasting station 12.

Particularly, the mobile terminal 16 requests, when viewing of the received broadcasting content is interrupted, the server 13 to record the interrupted broadcasting content. The server 13 records the broadcasting content in the storage unit 14 from an interrupted point in time of the broadcasting content according to a request of the mobile terminal 16. When the user requests to reproduce the recorded broadcasting content through one of the terminals 16 and 18 connected to the server 13, the server 13 sends the recorded broadcasting content to the terminals 16 and 18 to enable the user to view the broadcasting content from an interrupted point in time.

The wireless communication network 15 connecting the server 13 and the mobile terminal 16 is one of Wireless Broadband (WiBro), Global System for Mobile Communication (GSM), Wireless Local Area Network (WLAN), and High-Speed Downlink Packet Access (HSDPA). A type of broadcasting may be one of terrestrial broadcasting, satellite broadcasting, and cable broadcasting. The broadcasting content may be one of terrestrial, satellite, and cable broadcasting content. The mobile terminal 16 may be one of a mobile communication terminal, Personal Digital Assistant (PDA), Portable Multimedia Player (PMP), and notebook computer.

Particularly, the mobile terminal 16 sends to the server 13 recording request information of the interrupted broadcasting content so that the server 13 may record the interrupted broadcasting content. The recording request information includes the type of broadcasting of the broadcasting content, a broadcasting channel, a name of the broadcasting content, and an interrupted point in time of the broadcasting content.

The server 13 extracts an interrupted broadcasting content among the broadcasting content received in the server 13 based on the recording request information and records the extracted broadcasting content in the storage unit 14 from the interrupted point in time.

The interrupted broadcasting content is recorded according to a recording method set by the user through the mobile terminal 16. The recording method is one of a manual recording method, a specific broadcasting content recording method, and an automatic recording method. The manual recording method is a method of recording the interrupted broadcasting content whereby, if viewing of a broadcasting content is interrupted, the mobile terminal requests the server to record the broadcasting content if requested by the user. The specific broadcasting content recording method is a method whereby, if viewing of a specific broadcasting content specified by the user is interrupted, only the specific broadcasting content is recorded. The automatic recording method is a method whereby, if viewing of a broadcasting content is interrupted, the interrupted broadcasting content is automatically recorded.

The home terminal 18 may be one of a personal computer (PC) monitor and a television. The home terminal 18 is connected to the server 13 through a wire 21 or through a local area wireless communication network 22 such as Bluetooth® and wireless-fidelity (Wi-Fi). In the present exemplary embodiment, a first home terminal 18a is connected to the server 13 through the local area wireless communication network 22, and a second home terminal 18b is connected to the server 13 through the wire 21.

A method of recording broadcasting content of the home network system 10 according to the present invention is described in detail through an exemplary embodiment.

Figure 2:
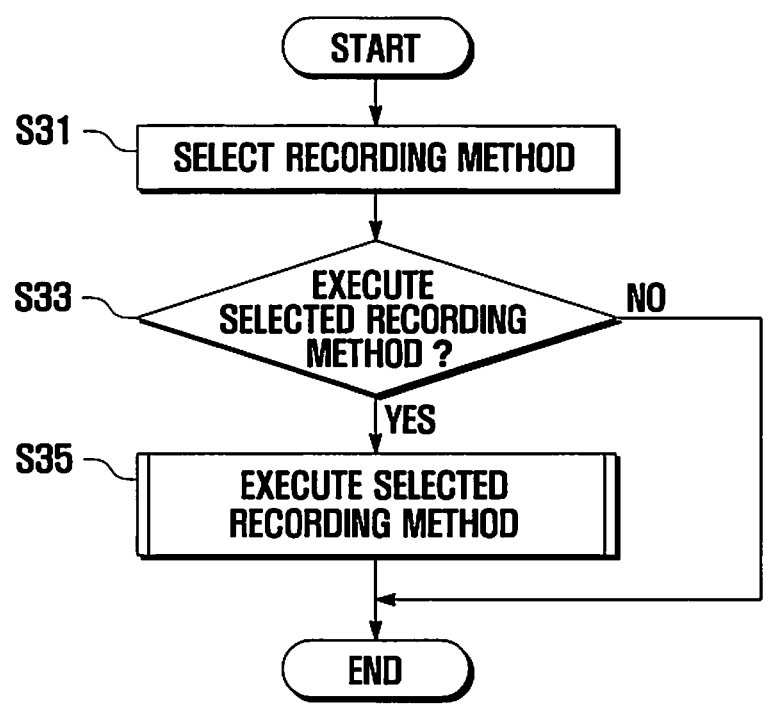
FIG. 2 is a flowchart illustrating a method of recording a broadcasting content of a home network system according to another exemplary embodiment of the present invention.

FIG. 2 is a flowchart illustrating a method of recording broadcasting content of the home network system 10 according to another exemplary embodiment of the present invention.

Referring to FIGS. 1 and 2, the method of recording broadcasting content is described in detail as follows.

A recording method is selected by a user in the mobile terminal 16 in step S31. The user can select one of a manual recording method, a specific broadcasting content recording method, and an automatic recording method using the mobile terminal 16.

Next, the mobile terminal 16 determines whether the user requests to execute the selected recording method in step S33. If the user requests to execute the selected recording method, the mobile terminal 16 executes the selected recording method in step S35. If the user does not request to execute the selected recording method, the mobile terminal 16 does not execute the selected recording method. For example, the mobile terminal 16 displays a pop-up window for inquiring whether to execute the selected recording method in the display unit 17. A pop-up window for inputting "Yes" or "No" is displayed in the display unit 17, and the user selects "Yes" or "No" through key input, thereby determining whether to execute the selected recording method.

If a specific broadcasting content recording method is selected at step S31, a process of specifying a specific broadcasting content is also performed.

Figure 3A:
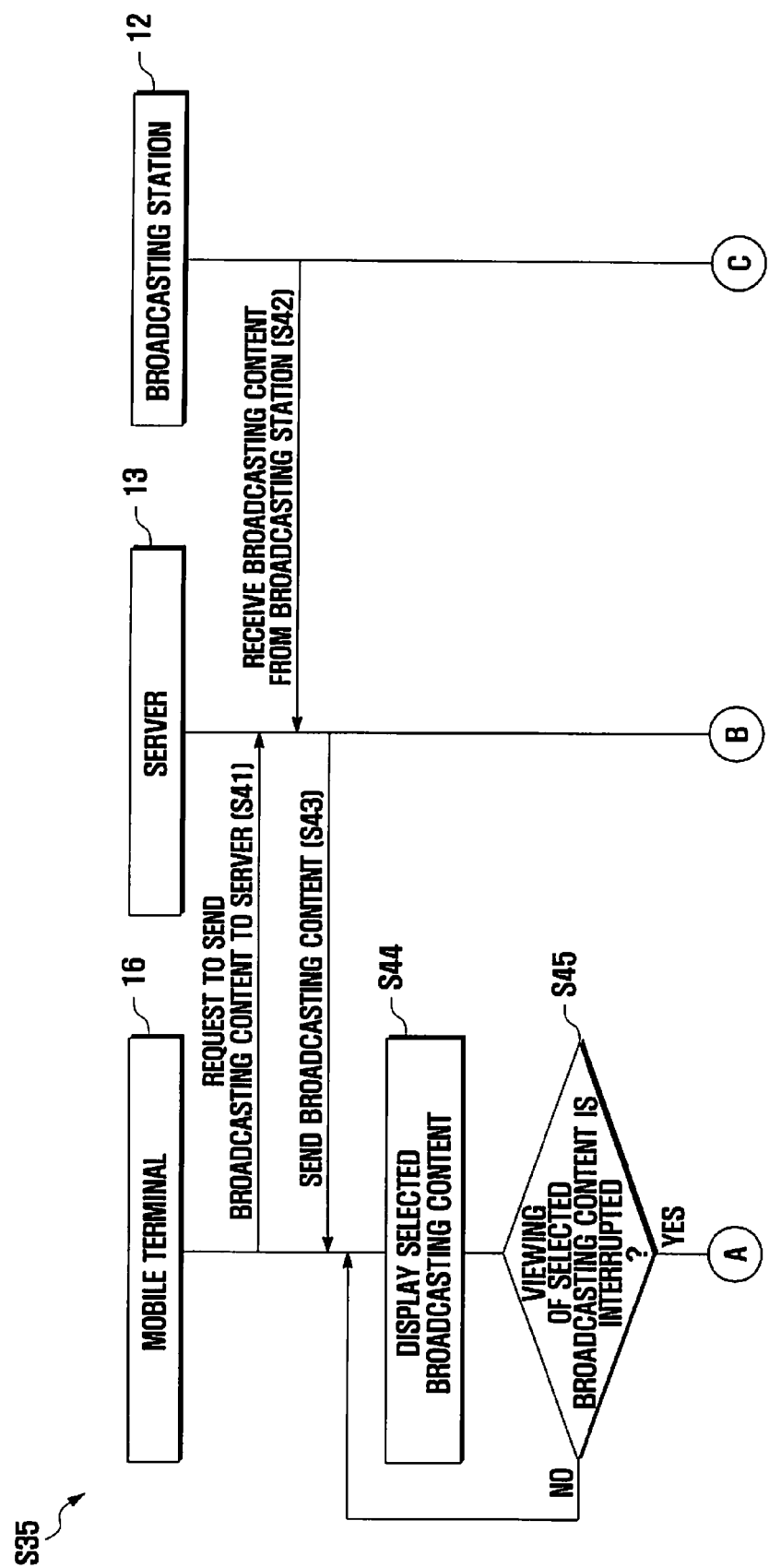

FIGS. 3A and 3B is a message flow diagram illustrating an execution process of a manual recording method selected in the method of FIG. 2.

Referring to FIGS. 1, 3A and 3B, the execution process of step S35 of a manual recording method, selected at step S31 of FIG. 2, is described in detail as follows.

Upon request by the user, the mobile terminal 16 requests the server 13 to send broadcasting content in step S41. The server 13 receives the broadcasting content from the broadcasting station 12 in step S42, and sends the received broadcasting content to the mobile terminal 16 in step S43. The user selects broadcasting content to view among broadcasting contents received in the mobile terminal 16, and the mobile terminal 16 displays the selected broadcasting content in step S44. The mobile terminal 16 displays the selected broadcasting content in the display unit 17 in a streaming method.

Thereafter, if viewing of the selected broadcasting content is interrupted in step S45, the mobile terminal 16 determines if the user requests to record the interrupted broadcasting content in step S46. For example, the mobile terminal 16 displays a pop-up window for inquiring whether to record the interrupted broadcasting content in the display unit 17. A pop-up window for inputting "Yes" or "No" is displayed in the display unit 17, and the user selects "Yes" or "No" through key input, thereby determining whether to record the interrupted broadcasting content.

If the mobile terminal 16 receives a user request for recording, the mobile terminal 16 requests the server 13 to record the interrupted broadcasting content in step S47. The mobile terminal 16 sends recording instruction information to the server 13.

The server 13 extracts the interrupted broadcasting content from among broadcasting content received in the server 13 based on the recording request information in step S48. The server 13 records the extracted broadcasting content in the storage unit 14 from an interrupted point in time in step S49.

The user requests the mobile terminal 16 to reproduce the broadcasting content recorded in the server 13 at a desired location and time in step S50. The server 13 sends the recorded broadcasting content requested by the user to the mobile terminal 16 in step S51. The mobile terminal 16 displays the received recorded broadcasting content in step S52. Accordingly, the user can view the broadcasting content from the interrupted point in time at a desired location and time.

In the present exemplary embodiment, an example of requesting and viewing the broadcasting content recorded in the server 13 through the mobile terminal 16 is described, however the user can view the broadcasting content recorded in the server 13 through the home terminal 18 connected to the server 13.

Figure 4A:
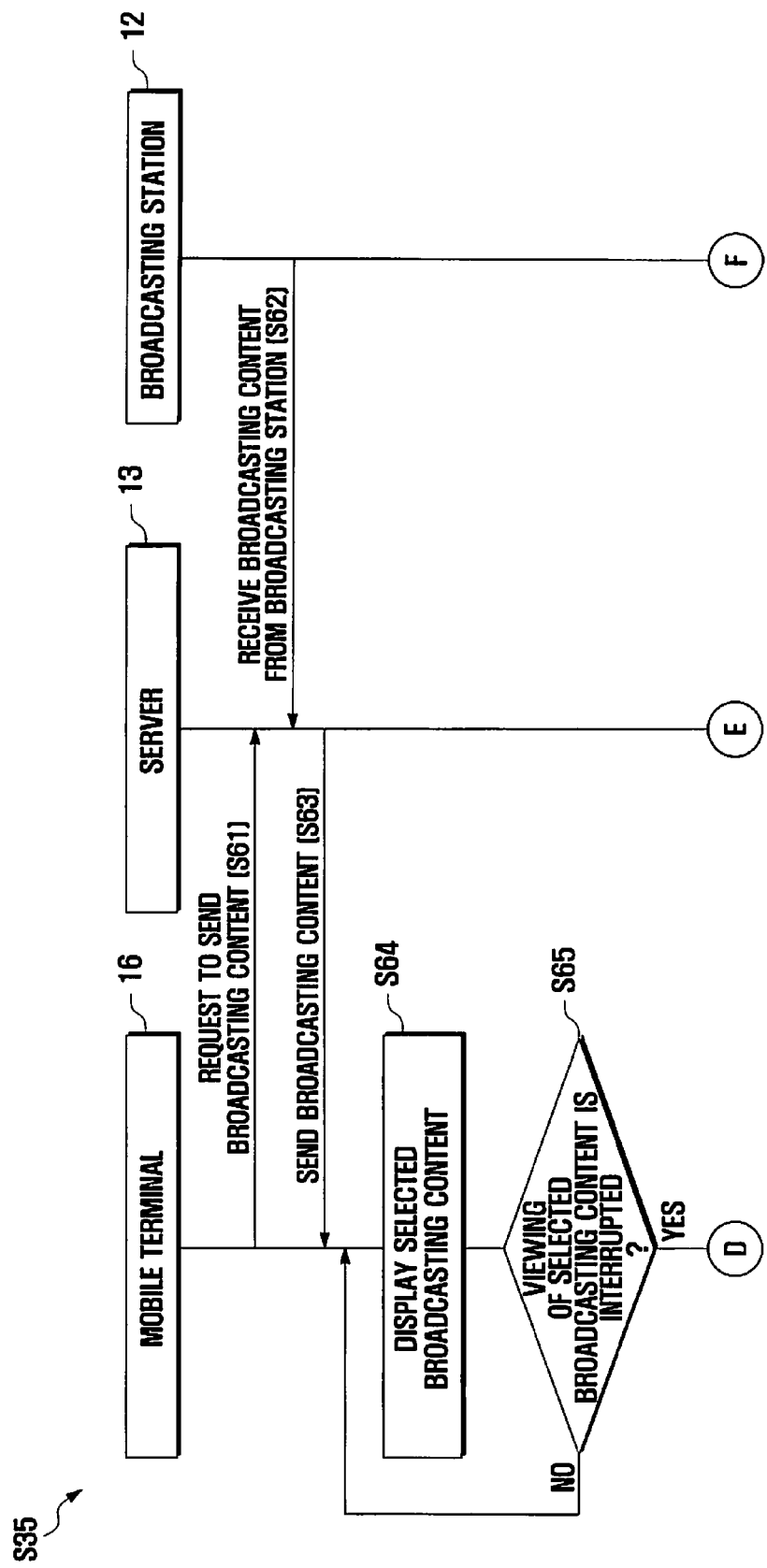
FIGS. 4A and 4B is a message flow diagram illustrating an execution process of a specific broadcasting content recording method selected in the method of FIG. 2.
Figure 4B:
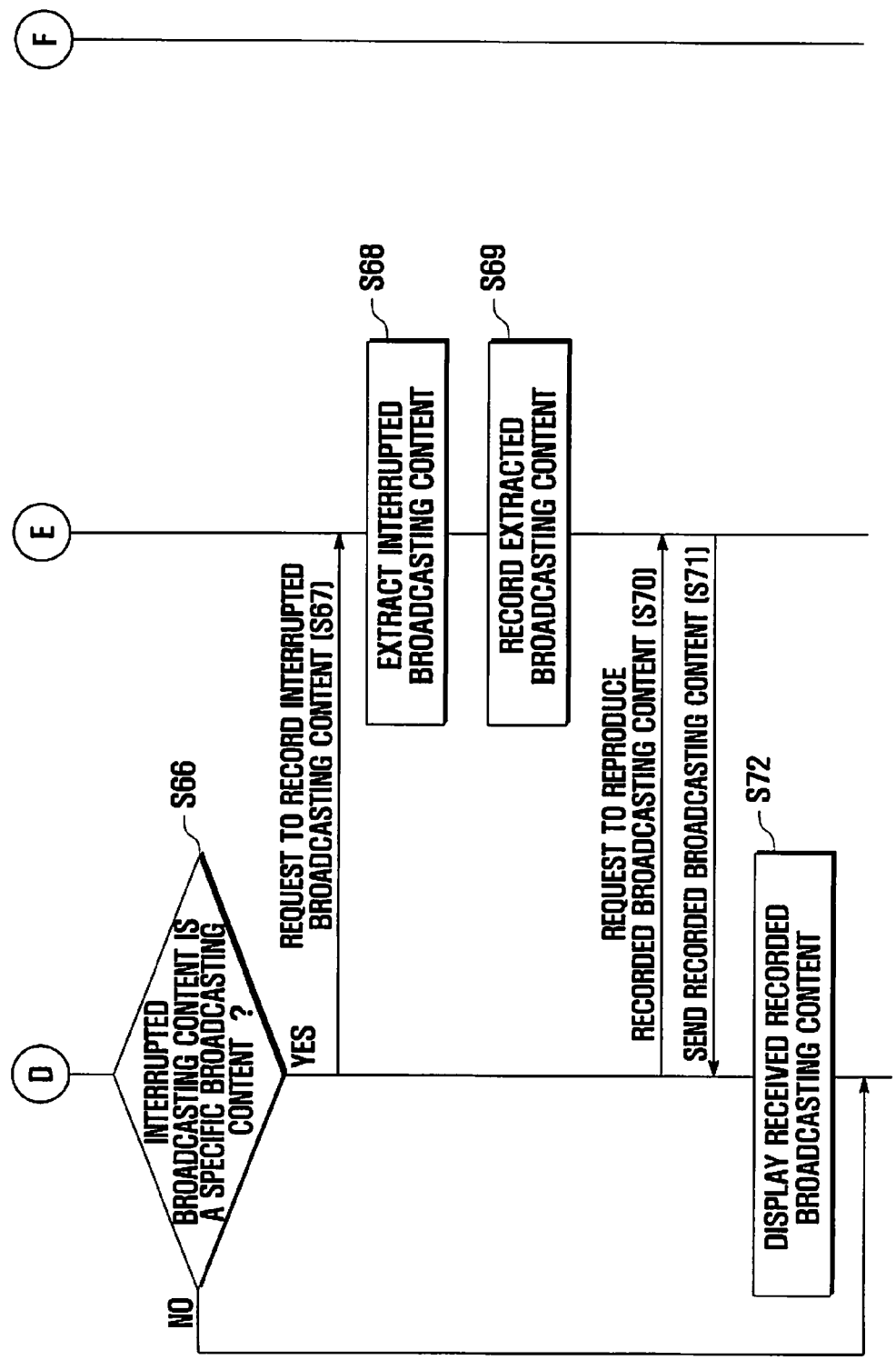

FIGS. 4A and 4B is a message flow diagram illustrating an execution process of a specific broadcasting content recording method selected in the method of FIG. 2.

Referring to FIGS. 1, 4A and 4B, the execution process in step S35 of a specific broadcasting content recording method is described in detail as follows.

Steps S61 to S65 in the execution process in step S35 of the specific broadcasting content recording method are identical to steps S41 to S45 of the manual recording method, and therefore a detailed description thereof is omitted.

If viewing of the selected broadcasting content is interrupted at step S65, the mobile terminal 16 determines if the interrupted broadcasting content is a specific broadcasting content in step S66. If the interrupted broadcasting content is a specific broadcasting content, the mobile terminal 16 requests the server 13 to record the interrupted broadcasting content in step S67.

Steps S68 to S72 of the specific broadcasting content recording method are identical to steps S48 to S52 of the manual recording method.

If the interrupted broadcasting content is not a specific broadcasting content at step S66, the mobile terminal 16 does not request the server 13 to record the interrupted broadcasting content, and a process of recording the interrupted broadcasting content is not performed.

Figure 5A:
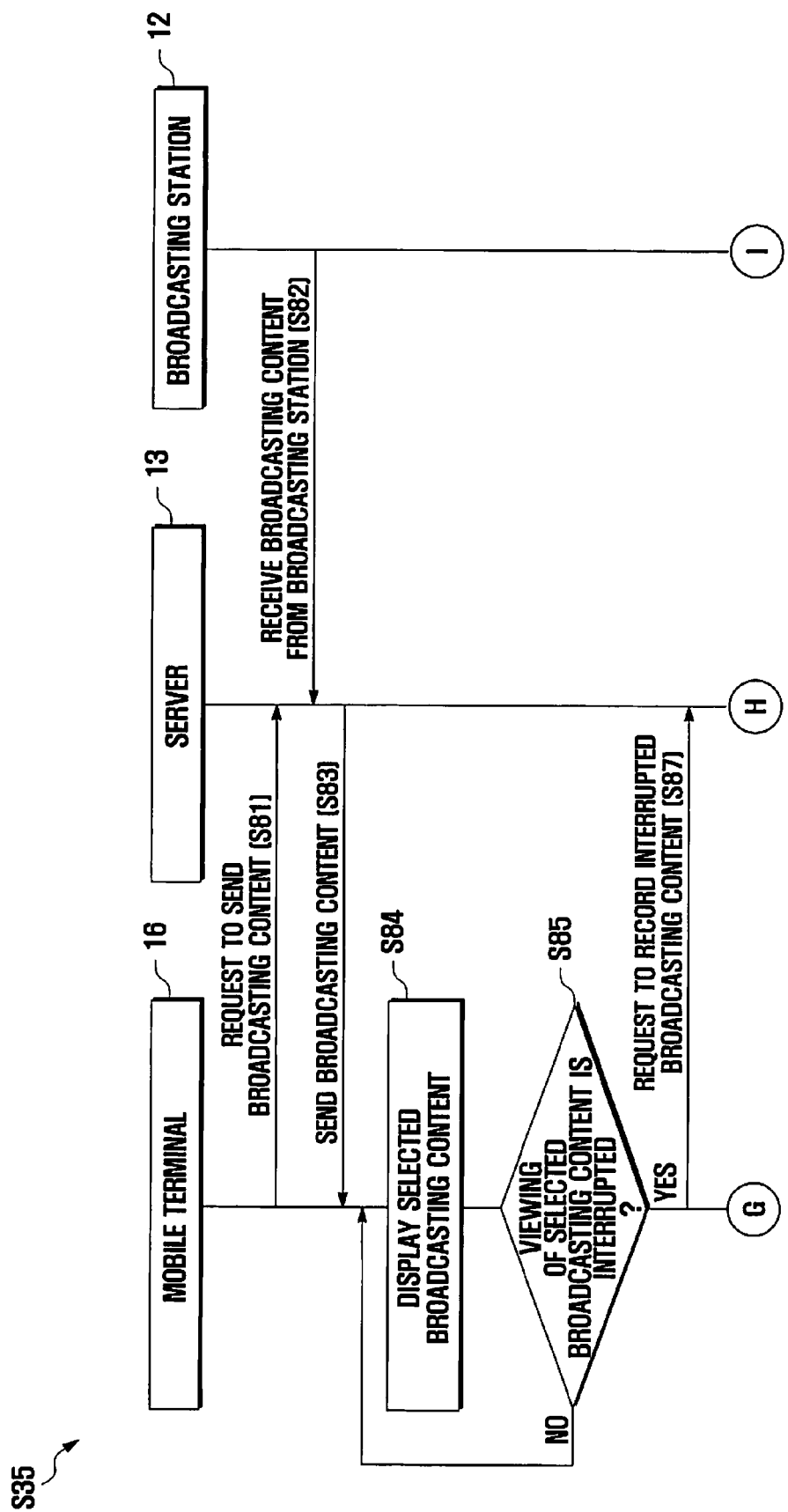
FIGS. 5A and 5B is a message flow diagram illustrating an execution process of an automatic recording method selected in the method of FIG. 2.
Figure 5B:
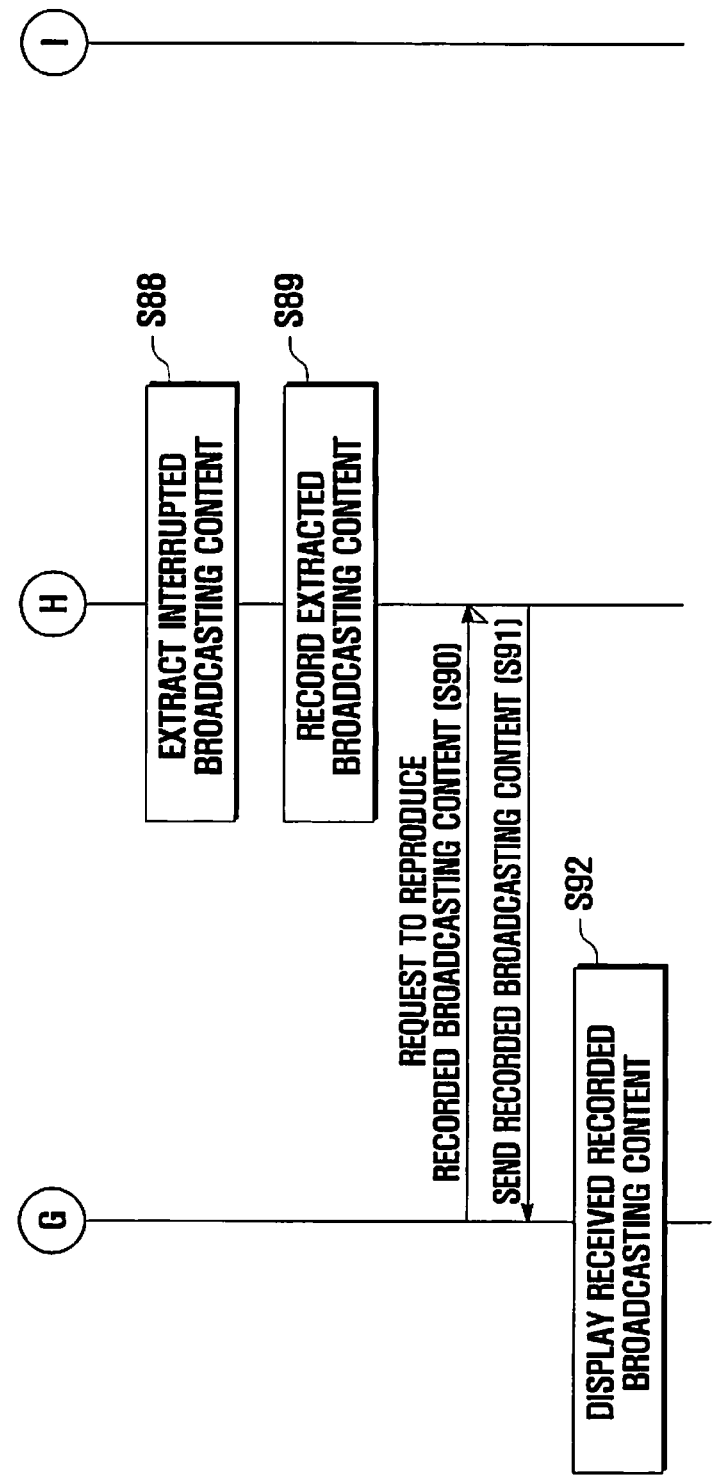

FIGS. 5A and 5B is a message flow diagram illustrating an execution process of an automatic recording method selected in the method of FIG. 2.

Referring to FIGS. 1, 5A and 5B, the execution process in step S35 of the automatic recording method is described in detail as follows.

Steps S81 to S85 in the execution process in step S35 of the automatic recording method are identical to steps S41 to S45 of the manual recording method, and therefore a detailed description thereof is omitted.

If the selected broadcasting content 16 is interrupted at step S85, the mobile terminal 16 automatically requests the server 13 to record the interrupted broadcasting content in step S87.

Steps S88 to S92 of the automatic recording method are identical to steps S48 to S52 of the manual recording method.

In the present exemplary embodiment, an example in which the mobile terminal receives the broadcasting content sent from the broadcasting station via the server is described, however the mobile terminal can directly receive the broadcasting content from the broadcasting station.

A recording method that combines a specific broadcasting content recording method and a manual recording method can be used and is described as follows.

If viewing of a broadcasting content is interrupted, the mobile terminal determines if the interrupted broadcasting content is a specific broadcasting content. If the interrupted broadcasting content is a specific broadcasting content, the mobile terminal requests the server to record the interrupted broadcasting content. If the interrupted broadcasting content is not a specific broadcasting content, the mobile terminal performs a manual recording method by inquiring a user whether to record the interrupted broadcasting content.

As described above, according to the present invention, when viewing of broadcasting content is interrupted in a mobile terminal, the mobile terminal requests a server to record the interrupted broadcasting content, and the server records the broadcasting content from an interrupted point in time. Therefore, a user can request the terminal to reproduce the broadcasting content recorded in the server at a desired location and time and can view the broadcasting content from the interrupted point in time.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of recording broadcasting content in a home network system including a wireless mobile terminal and a home terminal connected to a server through a wireless communication network, comprising:

requesting, by the wireless mobile terminal, the server to send the broadcasting content through the wireless communication network;

receiving, by the server, the broadcasting content from a broadcasting station and sending the received broadcasting content to the wireless mobile terminal through the wireless communication network;

displaying, by the wireless mobile terminal, the received broadcasting content;

if the displaying of the broadcasting content is interrupted, sending to the server through the wireless communication network, by the wireless mobile terminal, recording request information of the interrupted broadcasting content comprising an interrupted point in time of the interrupted broadcasting content;

recording, by the server, the interrupted broadcasting content from the interrupted point in time according to the recording request information of the interrupted broadcasting content;

requesting, by the wireless mobile terminal or a home terminal, the server to reproduce the recorded broadcasting content; and receiving and displaying the recorded broadcasting content from the server, wherein sending the recording request information of the interrupted broadcasting content comprises:

determining whether the interrupted broadcasting content is a specific broadcasting content specified by the user; and when the interrupted broadcasting content is the specific broadcasting content, sending the recording request information to the server without input from the user.

2. The method of claim 1, wherein the broadcasting content is one of terrestrial, satellite, and cable broadcasting content.

3. The method of claim 1, wherein the recording request information further comprises at least one of a type of broadcasting of the broadcasting content, a broadcasting channel, and a name of the broadcasting.

4. The method of claim 1, wherein the step of recording, by the server, the broadcasting content from an interrupted point in time of the broadcasting content comprises:
    extracting the interrupted broadcasting content from among received broadcasting content based on the recording request information; and
    recording the extracted broadcasting content from the interrupted point in time.

5. The method of claim 1, wherein the step of requesting the server to record the interrupted broadcasting content comprises if the wireless mobile terminal receives a request for recording the interrupted broadcasting content by a user, requesting the server to record the interrupted broadcasting content.

6. The method of claim 1, wherein the step of requesting the server to record the interrupted broadcasting content comprises if the displaying of the broadcasting content is interrupted, automatically requesting by the wireless mobile terminal, the server to record the interrupted broadcasting content.

7. The method of claim 1, wherein the requesting the server to record the interrupted broadcasting content further comprises:
    when the interrupted broadcasting content is not the specific broadcasting content, sending the recoding request information to the server when the wireless mobile terminal receives a request for recording the interrupted broadcasting content by a user.

8. A method of recording broadcasting content in a home network system including a wireless mobile terminal connected to a server through a wireless communication network, comprising:
    receiving, by the wireless mobile terminal, broadcasting content from a broadcasting station through the wireless communication network and displaying the received broadcasting content;
    if the displaying of the broadcasting content is interrupted, sending to the server, by the wireless mobile terminal, recording request information of the interrupted broadcasting content comprising an interrupted point in time of the interrupted broadcasting content, through the wireless communication network;
    recording, by the server, the interrupted broadcasting content from the interrupted point in time according to the recording request information of the interrupted broadcasting content;
    requesting, by the wireless mobile terminal or a home terminal, the server to reproduce the recorded broadcasting content; and
    receiving and displaying the recorded broadcasting content from the server,
    wherein sending the recording request information of the interrupted broadcasting content comprises:
    determining whether the interrupted broadcasting content is a specific broadcasting content specified by the user; and
    when the interrupted broadcasting content is the specific broadcasting content, sending the recording request information to the server without input from the user.

9. A home network system comprising:
    a server for receiving broadcasting content from a broadcasting station, for sending the received broadcasting content and for recording broadcasting content; and
    a wireless mobile terminal for receiving and displaying the broadcasting content from a broadcasting station or the server, for sending to the server through a wireless communication network recording request information of the interrupted broadcasting content comprising an interrupted point in time of the interrupted broadcasting content if the displaying of the received broadcasting content is interrupted, requesting the server to reproduce the recorded broadcasting content; and for receiving and displaying the recorded broadcasting content from the server,
    wherein the server records the interrupted broadcasting content from the interrupted point in time based on the recording request information when receiving a request for recording the interrupted broadcasting content from the wireless mobile terminal, wherein the wireless mobile terminal requests the server to reproduce the recorded broadcasting content, and receives and displays the recorded broadcasting content from the server,
    wherein the wireless mobile terminal determines, when displaying the received broadcasting content is interrupted, whether the interrupted broadcasting content is a specific broadcasting content specified by the user, and
    wherein the wireless mobile terminal automatically sends, when the interrupted broadcasting content is the specific broadcasting content, the recording request information to the server without input from the user.

10. The home network system of claim 9, wherein the recording request information further comprises at least one of a type of broadcasting of the broadcasting content, a broadcasting channel, and a name of the broadcasting content.

11. The home network system of claim 10, wherein the server extracts the interrupted broadcasting content from among received broadcasting contents based on the recording request information, and records the extracted broadcasting content from the interrupted point in time.

12. The home network system of claim 9, wherein if the wireless mobile terminal receives a request for recording the interrupted broadcasting content by a user the wireless mobile terminal requests the server to record the interrupted broadcasting content.

13. The home network system of claim 9, wherein the wireless mobile terminal sends, when the interrupted broadcasting content is not the specific broadcasting content, the recording request information to the server when the wireless mobile terminal receives a request for recording the interrupted broadcasting content from a user.

14. The home network system of claim 9, further comprising a home terminal for requesting the server to reproduce the recorded broadcasting content and for receiving and displaying the recorded broadcasting content from the server.

* * * * *